United States Patent [19]

Deininger et al.

[11] 4,451,338

[45] May 29, 1984

[54] PROCESS FOR MAKING A CALCIUM/SODIUM FERRATE ADDUCT BY THE ELECTROCHEMICAL FORMATION OF SODIUM FERRATE

[75] Inventors: J. Paul Deininger; Ronald L. Dotson, both of Cleveland, Tenn.

[73] Assignee: Olin Corporation, New Haven, Conn.

[21] Appl. No.: 490,756

[22] Filed: May 2, 1983

Related U.S. Application Data

[63] Continuation-in-part of Ser. No. 246,789, Mar. 23, 1981, abandoned.

[51] Int. Cl.$^3$ .............................................. C25B 1/30
[52] U.S. Cl. ...................................................... 204/86
[58] Field of Search ........................................ 204/86

[56] References Cited

U.S. PATENT DOCUMENTS

| | | | |
|---|---|---|---|
| 669,441 | 3/1901 | Frasch | 204/113 |
| 2,275,223 | 3/1942 | Hardoen | 204/56 |
| 2,455,696 | 12/1948 | Mosesman | 252/231.5 |
| 2,758,090 | 8/1956 | Mills et al. | 252/186 |
| 2,835,553 | 5/1958 | Harrison et al. | 23/50 |
| 2,967,807 | 1/1961 | Osborne et al. | 204/98 |
| 3,632,802 | 1/1972 | De Miller et al. | 260/233.3 R |
| 3,904,496 | 9/1975 | Harke et al. | 204/98 |
| 4,036,714 | 7/1977 | Spitzer | 204/98 |
| 4,201,637 | 5/1980 | Peterson | 204/197 |

OTHER PUBLICATIONS

J. Tousek, "Electrochemical Production of Sodium Ferrate", *Collection Czeckoslov Chem. Commun.*, vol. 27, pp. 914, 919 (1962).
Miller, "The Preparation, Determination, and Analytical Applications of Iron (VI)", *Analytical Chemistry*, pp. 3343-B
Mellor, "A Comprehensive Treatise in Inorganic & Theoretical Chemistry", vol. XIII, pp. 929-937, (1952).
Grube et al., *Zeitschrift fur Electrochemie*, vol. 26, No. 7/8, pp. 153-161, (1920).
Chemical Abstracts 89:135578c 1978.
Kirk-Othmer Encyclopedia of Chemical Technology, 2 Edition, vol. 12, p. 40, 1967.
Goff et al., *J. of the American Chemical Society*, vol. 93:23, pp. 6058-6065, Nov. 17, 1971.
Scholder et al., *Z. Anorg. Allg. Chemie*, vol. 282, pp. 262-279, 1955.
Andett et al., *Inorganic Chemistry*, vol. 11, No. 8, pp. 1904-1908, (1972).
J. M. Schoreger, "Higher Valence Compounds of Iron", Doctoral Thesis at Oregon State College, Jun. 1948.
Chemical Abstracts 86: 78488k 1977.
Grube et al., *Zeitschrift fur Electrochemie*, vol. 26, No. 21/22, pp. 459-471, (1920).
Chemical Abstracts 65: 16467, 1966.
Helferich et al., *Z. Anorg. Allg. Chemie*, 263, pp. 169-174, 1956.
Pick, *Zeitschrift fur Electrochemie*, 7, pp. 713-724, 1901.

*Primary Examiner*—T. Tung
*Attorney, Agent, or Firm*—Arthur E. Oaks; William A. Simons; Donald F. Clements

[57] ABSTRACT

Described is a process for making a calcium/sodium ferrate adduct with sodium ferrate in a divided-type electrolysis cell. The anolyte chamber of the cell is charged with an aqueous solution of sodium hydroxide and a sodium ferrate-stabilizing proportion of at least one sodium halide salt. The anolyte chamber additionally contains ferric ions [Fe(III)]. The catholyte chamber contains an aqueous sodium hydroxide solution during operation. The source of ferric ion in the anolyte may be either an iron-containing anode or at least one iron-containing compound present in the anolyte solution or both. The preferred material separating the anolyte chamber from the catholyte chamber is comprised of a gas- and hydraulic-impermeable, ionically-conductive, chemically-stable ionomeric film (e.g., a cation-exchange membrane with carboxylic, sulfonic or other inorganic exchange sites). Sodium ferrate is prepared in the anolyte chamber by passing an electric current and impressing a voltage between the anode and cathode of the cell. During electrolysis, sodium ferrate forms in the aqueous sodium hydroxide anolyte. This anolyte is reacted with a calcium compound to produce a calcium/sodium ferrate adduct. Alternatively the sodium ferrate may be first recovered in a solid form and then reacted with a calcium compound to produce said adduct.

41 Claims, No Drawings

PROCESS FOR MAKING A CALCIUM/SODIUM FERRATE ADDUCT BY THE ELECTROCHEMICAL FORMATION OF SODIUM FERRATE

This application is a continuation-in-part of copending application Ser. No. 246,789, filed March 23, 1981, now abandoned.

BACKGROUND OF THE INVENTION

1. Field of the Invention

The present invention relates to the production of a calcium/sodium ferrate adduct by an electrolytic process for forming sodium ferrate in a divided-type electrolysis cell.

2. Description of the Prior Art

Alkali metal ferrates resemble permanganate in having a purple color and, in acid solutions, they evolve oxygen very rapidly.

The prior art teaches two principal methods for making alkali metal ferrates. One known method of preparation has been by electrolysis either in unseparated cells or in diaphragm-type electrolytic cells (i.e., multi-chamber cells which have an anolyte separated from the catholyte by a gas-porous, hydraulically permeable separator).

Besides such old electrochemical processes, alkali metal ferrates have been produced by the reaction of inorganic hypochlorites with iron-containing compounds in aqueous alkaline solutions.

However, sodium ferrate produced by such prior art methods becomes unstable and tends to degrade almost immediately. This lack of stability is due to the hydrolysis of sodium ferrate with water in the cell or the atmosphere to form ferric hydroxide. Also, the prior art methods for making sodium ferrate by electrochemical means (i.e., with undivided and diaphragm-type cells) also have the problem of anode passivity, which is caused by the formation of ferric oxide film on the iron anode. Further, once formed, ferric hydroxide has been found to catalyze such decomposition of $Na_2FeO_4$. To prevent such problems, it is necessary to either wash the anode with acid or reverse the current to remove such a ferric oxide film. However, these technqiues are costly or time-consuming, or both.

The strong oxidizing properties of ferrates suggest that they may be useful for a variety of commercial uses (e.g., oxidation of chemical moieties in waste water streams). However, the aforesaid instability tends to severely limit such utility for commercial applications. Thus, there is a need at the present time to find a commercial process for producing stabilized ferrates.

OBJECTS

It is a primary object of this invention to provide an improved electrolytic process for preparing a stabilized ferrate product.

Another object of this invention is to provide an improved process for conversion of a sodium ferrate solution resulting from electrolysis to a calcium/sodium ferrate adduct of said sodium ferrate.

These and other objects of the present invention will become apparent from the following description and the appended claims.

BRIEF SUMMARY OF THE INVENTION

The present invention, therefore, is directed to a process for the production of a calcium/sodium ferrate adduct of sodium ferrate, utilizing an electrolytic cell having an anolyte chamber containing an anode, a catholyte chamber containing a cathode, and a separator between the chambers, the process comprising the steps of:

(a) maintaining an aqueous mixture of a sodium hydroxide solution and a sodium ferrate-stabilizing proportion of at least one sodium halide salt in the anolyte chamber, the anolyte chamber additionally containing ferric ions [Fe(III)];

(b) maintaining an aqueous sodium hydroxide solution in the catholyte chamber;

(c) passing an electric current and impressing a voltage between the anode and the cathode whereby sodium ferrate is formed from the ferric ions in the sodium hydroxide solution in the anolyte chamber;

(d) reacting the sodium ferrate in the sodium hydroxide solution from the anolyte chamber with a calcium compound to precipitate a calcium/sodium ferrate adduct of sodium ferrate from the sodium hydroxide solution; and (e) recovering the precipitated calcium/sodium ferrate adduct from the sodium hydroxide solution.

DETAILED DESCRIPTION

1. General Cell Construction

Electrolytic cells employed in this invention may be a commercially available or a custom built diaphragm-type or membrane-type electrolytic cell of a size and electrical capacity capable of economically producing the desired sodium ferrate product. Since the electrolytic cell contains a strong base throughout, it should be constructed of any material resistant to strong bases and strong oxidant chemicals. It may be desirable to line the inside surfaces of the cell with a plastic material resistant to NaOH solutions and sodium ferrate or the cell may be constructed entirely of plastic material.

A particularly advantageous membrane-type electrolytic cell which may be employed in the practice of this process has separate anolyte and catholyte chambers, using a permselective cation exchange membrane as a separator. Located on one side of the membrane partition, the anolyte chamber has an outlet for any oxygen gas generated, and an inlet and an outlet for charging, removing or circulating anolyte. On the opposite side of the membrane partition, the catholyte chamber has inlets and outlets for the sodium hydroxide solution and an outlet for hydrogen liberated at the cathode by the electrolysis of water.

Electrolytic cells employed in the present invention may be operated on a batch or flow-through system. In the latter system, either anolyte or catholyte, or both, may be continuously circulated to and from external solution storage vessels.

Hydrogen gas is removed from the catholyte chamber and collected for use as a fuel or otherwise disposed of. Any oxygen gas evolved is likewise removed from the anolyte chamber

2. Separator Construction

The material employed as a separator between the anolyte and catholyte chambers should be physically and chemically-stable to strong sodium hydroxide solutions and to strong oxidizing chemicals (e.g., sodium ferrate) before, during, and after cell operation. The separator material should also be ionically conductive and allow ion flow between the two chambers. Specifically, the ionic transport of ferrate ion [$FeO_4^{-2}$] through the separator should be much lower than that of the sodium ion [$Na^+$], hydroxide ion [$OH^-$] and hydrogen ion [$H^+$].

One suitable class of separator material that may be employed is porous or microporous material (i.e., diaphragm material) which allows some hydraulic flow, or gas flow, or both between the anolyte and catholyte chambers. Preferably, these porous and microporous materials may be made of high surface-tension materials and have pore structures which will inhibit most hydraulic permeation. Examples of suitable diaphragm materials include polytetrafluoroethylene, polyvinyl chloride, glass, silica, ceramic, asbestos and the like.

However, it is preferred to employ a separator material which is gas- and hydraulic-impermeable permselective ionomeric film (i.e., membranes) besides being ionically conductive and chemically and physically stable to strong aqueous sodium hydroxide solutions and strong oxidizers like sodium ferrate. Such membranes are preferentially less permeable to ferrate ions than cationic sodium ion.

Material suitable for use as membranes in the process of this invention include cation exchange materials like the sulfonic acid substituted perfluorocarbon polymers of the type described in U.S. Pat. No. 4,036,714, which issued on July 19, 1977 to Robert Spitzer; the primary amine substituted polymers described in U.S. Pat. No 4,085,071, which issued on Apr. 18, 1978 to Paul Raphael Resnick et al; the polyamine substituted polymers of the type described in U.S. Pat. No. 4,030,988, which issued on June 21, 1977 to Walther Gustav Grot; and the carboxylic acid substituted polymers described in U.S. Pat. No. 4,065,366, which issued on Dec. 27, 1977 to Yoshio Oda et al. All of the teachings of these patents are incorporated herein in their entirety by reference.

With respect to the sulfonic acid substituted polymers of U.S. Pat. No. 4,036,714, these membranes are preferably prepared by copolymerizing a vinyl ether having the formula $FSO_2CF_2CF_2OCF(CF_3)CF_2OCF=CF_2$ and tetrafluoroethylene followed by converting the $FSO_2-$ group to a moiety selected from the group consisting of $HSO_3^-$, alkali metal sulfonate, and mixtures thereof. The equivalent weight of the preferred copolymers range from 950 to 1350 where equivalent weight is defined as the average molecular weight per sulfonyl group.

With reference to the primary amine substituted polymers of U.S. Pat. No. 4,085,071, the basic sulfonyl fluoride polymer of the U.S. Pat. No. 4,036,714 above is first prepared and then reacted with a suitable primary amine wherein the pendant sulfonyl fluoride groups react to form N-monosubstituted sulfonamido groups or salts thereof. In preparing the polymer precursor, the preferred copolymers utilized in the film are fluoropolymers or polyfluorocarbons although others can be utilized as long as there is a fluorine atom attached to the carbon atom which is attached to the sulfonyl group of the polymer. The most preferred copolymer is a copolymer of tetrafluoroethylene and perfluoro(3,6-dioxa-4-methyl-7-octenesulfonyl fluoride) which comprises 10 to 60 percent, preferably 25 to 50 percent by weight of the latter. The sulfonyl groups are then converted to N-monosubstituted sulfonamido groups or salt thereof through the reaction of a primary amine.

Polymers similar to the above U.S. Pat. No. 4,085,071 are prepared as described in U.S. Pat. No. 4,030,988 wherein the backbone sulfonated fluoride polymers are reacted with a di- or polyamine, with heat treatment of the converted polymer to form diamino and polyamino substituents on the sulfonyl fluoride sites of the copolymer.

The carboxylic acid substituted polymers of U.S. Pat. No. 4,065,366 are prepared by reacting a fluorinated olefin with a comonomer having a carboxylic acid group or a functional group which can be converted to a carboxylic acid group. It is preferred to use a fluorinated copolymer having a molecular weight to give the volumetric melt flow rate of 100 millimeters per second at a temperature of 250° C. to 300° C. Preferably, the membrane is prepared by copolymerizing tetrafluoroethylene with $CF_2=CFO(CF_2)_3COOCH_3$. Such polymers are believed to prevent substantial diffusion of the divalent ferrate ion [$FeO_4^{-2}$] through them. Also, such membranes are generally water-saturated, and when coupled with a low membrane thickness, will produce very low voltages across the membrane.

The thickness of the membrane may be in the range from about 1 to about 20 mils, and preferably from about 2 to about 5 mils. For selected membranes, a laminated inert cloth supporting material for the membrane of polytetrafluoroethylene may be used.

Although the aforesaid membranes appear to provide the highest overall efficiency of the operation of the process of this invention, one skilled in the art will recognize that any inert hydrophilic membrane, porous or microporous separator material that is capable of effecting the electrolytic production of sodium ferrate may be used in the process of this invention. Furthermore, the aforesaid classes of membrane material may be constructed in a manner so that they act as hydraulically permeable (i.e., diaphragms) rather than hydraulically impermeable (i.e., membranes). See U.S. Pat. No. 4,055,475, which issued to Dotson, et al on Oct. 25, 1977, for examples of such construction. All of the teachings of this patent are incorporated herein in its entirety by reference.

3. Anode Construction

At least one electrode is positioned within the anolyte chamber and one electrode within the catholyte chamber. For maximum exposure of the electrolytic surface, the face of each electrode should preferably be parallel to the plane of the membrane.

The anode may be made of any conventional iron-containing anode material or, if the ferric ion source in the anolyte is different than the anode, may be of any conventional non-iron anode material. However, the anode configuration is not critical, but should be shaped such as to give minimal electrolyte resistance drop and the most uniform current and potential distribution across its surface. This is usually a flat-plate, expanded mesh, particulate or porous electrode structure. High surface area anodes such as steel or iron wool or finely divided scrap iron are preferred because they will achieve a higher cell efficiency than plate anodes under the same operating conditions.

Preferred for said iron-containing anode material is pure iron since this tends to minimize the occurrrence of impurities known to adversely affect the stability of sodium ferrate. Other materials which may be utilized include cast iron, wrought iron, carbon steel, stainless steel and iron alloys containing elements such as nickel, chromium, molybdenum, vanadium and the like. Of these, those highest in iron content such as cast iron and low-grade carbon steels are preferred.

Examples of non-iron materials which may be employed as the anode include commercially available platinized titanium, platinized tantalum, or platinized platinum electrodes, a deposit of platinum on titanium, platinum on tantalum, or platinum on platinum. Also, effective are anodes composed of graphite, nickel alloys, lead dioxide, lead dioxide-coated carbon or metal substrates and the like. One skilled in the art will recognize, however, that any anode construction capable of effecting electrolytic production of sodium ferrate by the oxidation of iron species present in the anolyte to the Fe(VI) moiety (i.e., $FeO_4^{-2}$) while in an aqueous sodium hydroxide solution containing at least one sodium halide compound may be used in the process of this invention.

4. Cathode Construction

Examples of materials which may be employed as the cathode are carbon steel, stainless steel, nickel, nickel molybdenum alloys, nickel vanadium alloys and others. Those skilled in the art will also recognize that any electronically-conducting material or substrate that is capable of effecting the electrolytic reduction of water to hydroxide with either high or low hydrogen overvoltage may be used as cathode construction material in the process of this invention.

5. Anolyte Parameters

The anolyte is comprised of an aqueous solution of sodium hydroxide that contains a sodium ferrate stabilizing proportion of at least one sodium halide salt. The anolyte also contains ferric ions which are produced either from the iron anode or ferric salts, or both. As will be explained in detail below, the sodium halide salt or salts is believed necessary to convert ferric ions [Fe(III)] to ferrate ions [$FeO_4^{-2}$] and then stabilize the resultant sodium ferrate so that the $FeO_4^{-2}$ will not degrade immediately.

The sodium hydroxide concentrations maintained in the anolyte may range from about 20% by weight to about 65% by weight of the aqueous solution in the anolyte. Preferably, NaOH concentrations in the range from about 40% to about 65% by weight of the aqueous solution are maintained. For the best efficiencies, the most preferred sodium hydroxide concentration is from about 50% to about 65% by weight of the aqueous solution. Generally, a suitable sodium hydroxide solution is charged into the anolyte chamber before electrolysis in order to maintain the above ranges of concentration throughout the operation.

The preferred sodium halide salts that may be added to the anolyte are sodium chloride, sodium hypochlorite, sodium bromide, sodium hypobromite and mixtures thereof. Alternatively, such sodium halide or hypohalite salts may be made in situ by the addition of $Cl_2$ or $Br_2$ to the sodium hydroxide anolyte solution; thus forming NaCl, NaOCl, NaBr or NaOBr. Fluoride and iodide salts may also be used, but are believed to be less desirable from a cost standpoint. The most preferred sodium halide salt is NaCl.

Any proportion of sodium halide salt or salts capable of effecting stabilization of sodium ferrate without adversely diluting the sodium ferrate product may be employed. The stabilized sodium ferrate will have improved storage and shipping properties. Besides stabilizing the sodium ferrate against degradation, the presence of at least one sodium halide salt in the anolyte is thought to increase the corrosion rate of iron surfaces in the anolyte (thereby increasing the amounts of ferric ions in solution). Also, it is found that sodium halide salts appear to break up the ferric ion gel which tends to form on iron anodes. Such gel formation has a major degradative influence on cell efficiency and has been a major problem with all prior art electrolytic based processes for ferrate production.

When employing sodium chloride as the sodium halide salt, its concentration in the anolyte is preferably maintained in the range from about 100 parts to about 15,000 parts per million parts by weight of the anolyte. More preferably, its concentration is from about 500 parts to about 10,000 parts per million parts by weight of anolyte. Equivalent amounts of other sodium halide salts may be employed. Expressed another way, the preferred operating range for NaCl would be from about 0.01% to about 1.5%, more preferably from about 0.05% to about 1.0%, by weight of the anolyte.

The weight ratio of sodium hydroxide to sodium halide salt in the anolyte ranges from about 25:1 to about 5,000:1 and preferably from about 50:1 to about 1,000:1.

The anolyte pH is maintained during the operation in the range from about 10 to greater than 14 and preferably at least about 14 because of the stability of the sodium ferrate product in any aqueous solution is extremely sensitive to the pH. With a pH below 10, the ferrate product may begin to decompose to liberate oxygen and form $Fe_2O_3$.

If the anode is made of non-ferrous material, it is necessary that the anolyte contain a source of ferric ions from which the sodium ferrate may be produced. Ferric ion sources include ferric salts such as ferric chloride and ferric sulfate or sources of pure iron such as iron particles, iron scraps and the like. If such ferric ion sources are employed instead of or concurrently with an iron anode, their amounts used in the anolyte would mainly depend upon the final concentration of sodium ferrate desired in the product after electrolysis.

Generally, the range of ferric ion concentration in the anolyte will be from about 0.001% to about 12% of the anolyte. The preferable concentration range of ferric ion will be from 0.1 to about 10% by weight. It should be noted that the ferric ion concentration may be less or greater than the above recited range during startup and shutdown of the cell; however, at equilibrium the concentration is preferably within these ranges.

6. Catholyte Parameters

The catholyte of the present invention, like the anolyte, is maintained during operation as aqueous sodium hydroxide solution. Generally, the NaOH concentration may range from about 20% by weight to about 65% by weight in the catholyte. Preferably, this NaOH concentration is from about 40% to about 65% by weight, and most preferably, from about 45% to about 65% by weight of the catholyte. However, unlike the anolyte, the catholyte may be initially charged with pure $H_2O$ before operation. Through the electrolysis operation, NaOH will be formed in the catholyte by the transport of $Na^+$ ions to the catholyte chamber and by their reaction therein with $OH^-$ ions. Water may be added to the catholyte during or after electrolysis to replenish the water consumed during the operation. Since the concentration of NaOH will be increasing in the catholyte, it may also be necessary to withdraw some concentrated NaOH solution or add additional water in order to maintain the concentration of sodium hydroxide solution in the preferred range.

7. Electrolysis Operating Parameters

The electrolysis step of this invention is performed by supplying a direct current to the cell and impressing a voltage across the cell terminals. Without being bound by any theory, it is believed that during the operation of this step, a direct current flows to activate an electrochemical charge transfer directly at the anode, thereby converting Fe(O) atoms to $Fe^{+3}$ ions. Then the $Fe^{+3}$ ions are converted to $FeO_4^{-2}$ ions by further electrochemical charge transfer. In the case where $Fe^{+3}$ ions are added to the anolyte in salt form rather than employing a Fe(O) anode, these $Fe^{+3}$ are also converted to $FeO_4^{-2}$ ions by electrochemical charge transfer.

The operating range for the current density of a membrane-type cell is from 0.01 to about 5.0 kiloamperes per square meter of actual current density ($kA/m^2$) at the anode. The cell potential can range from 1.5 volts to about 10 volts. The preferred range of cell voltage is from about 1.5 to about 4.0 volts, with currrent densities preferred from about 0.01 to about 1.0 $kA/m^2$ at the anode. The most preferred range of cell voltage is from about 1.5 to about 3.5 volts with a current density most preferred in the range from about 0.03 to about 0.5 $kA/m^2$ at the anode.

The operating temperature of a membrane cell is in the range from about 10° C. to about 80° C. Preferably, the operating temperature is in the range of about 20° C. to about 60° C. for fastest reaction with minimum product degradation. In most instances, the most preferred temperature range would be from about 35° C. to above 50° C. for highest yields. The temperature may vary in the range noted above, from just above the freezing point of the anolyte to about 80° C., depending in part on factors such as the sodium halide salt employed, the solubility and concentration of sodium hydroxide in the aqueous anolyte, ionic strength, and the electrical conductivity of the anolyte and others. When the temperature of the aqueous anolyte falls or is permitted to fall near the freezing temperature, little, if any, sodium ferrate will be formed because of substantial resistance to the passage of electric current due to freezing of the anolyte solution or crystallization of sodium halide from the NaOH. On the other hand, if the temperature of the anolyte rises or is permitted to rise above about 60° C., substantial undesirable side reactions, including product decomposition often occur resulting in lower product yield.

The operating pressure of the cell is essentially atmospheric. However, sub- or superatmospheric pressure may be used, if desired.

Sodium ferrate may be made in concentrations in the aqueous sodium hydroxide solution which range from trace amounts (about 0.001% by weight) to about 1.4% by weight of the anolyte. At the higher concentrations, sodium ferrate might begin to precipitate or crystallize out onto the anolyte or the bottom of the anolyte chamber. The preferred sodium ferrate concentrations are generally in the range from about 0.1% to about 1% by weight of the anolyte.

The distance between each electrode, either the anode or the cathode, to the membrane is known as the gap distance for that electrode. The gap distance of the anode to membrane and the cathode to membrane are independently variable. Changing these respective distances concurrently or individually may affect the operational characteristics of the electrolytic cell and is reflected in the calculated current efficiency. For the process of this invention for each electrode, the electrode current efficiency is defined as the ratio of the number of chemical equivalents of product formed divided by the electrical equivalents consumed in forming that product $\times 100$. This may be expressed mathematically by the following equation (A):

$$\% \text{ Current Efficiency} = \frac{A/B}{C/D} \times 100 \qquad (A)$$

where
 A = Mass of product produced in grams.
 B = Equivalent weight of product produced in grams per equivalent.
 C = Quantity of electricity consumed in making desired product in ampere hours.
 D = Faraday's Constant of 26.81 ampere hours per equivalent.

With the anolyte being composed of an aqueous solution of sodium hydroxide and a sodium halide salt, the preferable anode to membrane gap distance is in the range up to about 1 inch, and the preferable cathode to membrane gap distance is in the range up to about ½ inch. The anode current efficiency, as defined above by equation (A), may be optimized by the employment of an anolyte pH of at least about 14. The pH may be adjusted by periodic addition of sodium hydroxide to the anolyte solution during electrolysis.

It is not certain exactly how sodium ferrate is produced by the electrolysis process. However, without being bound by a theory, it is thought that the ferric ion source in either the iron anode or iron salt in the anolyte, or their combination, is converted by electrolysis, or by bulk reaction with $OH^-$ ions, respectively, into ferric oxy-hydroxide complexes [e.g., $Fe_xO_y\cdot nH_2O$ where n is at least one]. These complexes are next converted electrochemically in the presence of the halide ion to ferrate ions, which combines with $Na^+$ ions to form sodium ferrate. This theory is illustrated by the following two equations (B) and (C) wherein the ferric ion source is metallic Fe (such as an iron anode) or ferric chloride (such as added to the anolyte) and chloride ion is also present:

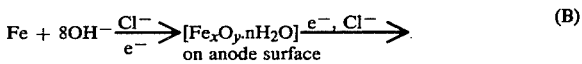

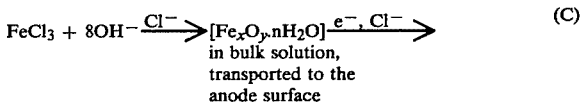

The main advantage of the use of a membrane-type electrolysis cell instead of a diaphragm-type or unseparated cell is the greatly increased current efficiency and lower power consumption. This is due to the elimination of two effects:

(a) electrochemical reduction of the ferrate ion at the cathode; and (b) chemical reduction of the ferrate ion by molecular hydrogen made at the cathode as illustrated in the following equation (D):

$$2FeO_4^= + 5H_2 \rightarrow Fe_2O_3 + 5H_2O \quad (D)$$

Another advantage of the present invention is that the hydrogen gas discharged from the catholyte chamber is isolated from any oxygen gas produced in the anolyte chamber by the competing reaction of $H_2O$ electrolysis in the anolyte. Because of this separation of chambers, the danger of forming explosive mixtures of hydrogen and residual oxygen gas is thereby minimized. This invention eliminates the need for an inert gas purge as is required in an undivided cell.

High product yield, high cell current efficiency and lower power consumption are achieved by proper selection of cell design and operating parameters, e.g., proper selection of anode to cathode gap, proper control of temperature, and NaOH concentrations in anolyte and catholyte.

8. Calcium/Sodium Ferrate Adduct Formation

The adduct, or addition product of the present invention, is formed when a calcium compound (e.g., $Ca(OH)_2$) is reacted with the sodium ferrate/sodium hydroxide solution from the anolyte chamber. Such a product comprises between about 2% and about 10% $Na_2FeO_4$ which has been either adsorbed on or precipitated with either a solid $Ca(OH)_2$ or $Ca(OH)_2 \cdot NaOH$ base structure. When stirred into water at a pH of below about 10, the adduct dissolves slowly with the result that ferrate ion is made available in a slow, time-consuming manner. Such a "time release" capability allows a considerable improvement in the ease of applying ferrate materials to many processes wherein the current instability of sodium ferrate now deters such use.

In one preferred operation, the anolyte solution is removed from the anolyte chamber and transferred to a suitable chemical reactor. This operation may be accomplished on a continuous or batch basis. The reactor may be equipped with a stirrer or agitator to ensure a complete reaction.

In the preparation of this adduct, any suitable calcium compound may be used to react with the sodium ferrate in the sodium hydroxide anolyte. Suitable calcium compounds preferably include calcium hydroxide, halides such as $CaBr_2$ and $CaCl_2$ and hypohalites such as $Ca(OCl)_2$. The most preferred compound is calcium hydroxide.

If a halide or a hypohalite salt is employed, it is preferred that the halide anion is chlorine or bromine. Chlorine is most preferred.

A major advantage of using calcium hydroxide is that no additional sodium hydroxide need be fed into the overall process. This is illustrated by the following chemical equations (E) to (I) wherein $Ca(OH)_2$ is utilized:

In the Membrane Cell

In the Anolyte Chamber $$Fe + 8NaOH \rightarrow Na_2FeO_4 + 6Na^+ + 4H_2O + 6e^- \quad (E)$$

In the Catholyte Chamber $$6Na^+ + 6H_2O + 6e^- \rightarrow 6NaOH + 3H_2 \quad (F)$$

Sum of Reactions in the Cell $$Fe + 2NaOH + 2H_2O \rightarrow Na_2FeO_4 + 3H_2 \quad (G)$$

In the Adduct Reactor $$Na_2FeO_4 + Ca(OH)_2 \rightarrow Ca(OH)_2 \cdot Na_2FeO_4 \quad (H)$$

Sum of Reactions in Membrane Cell & Adduct Reactor $$Fe + 2H_2O + Ca(OH)_2 + 2NaOH \rightarrow Ca(OH)_2 \cdot Na_2FeO_4 + 3H_2 \quad (I)$$

The overall process is balanced as to NaOH and little or no additional sodium hydroxide is needed. Furthermore, the use of calcium hydroxide in the adduct reactor is preferred because no additional salts (e.g., NaCl) need be recovered and disposed of. The creation of unwanted salt is illustrated by the following equation (J) which shows the chemistry of the overall process when calcium chloride is utilized instead of calcium hydroxide:

$$Fe + 4NaOH + 2H_2O + CaCl_2 \rightarrow Ca(OH)_2 \cdot Na_2FeO_4 + 2H_2 + 2NaCl \quad (J)$$

Comparison of equations (I) and (J) shows that the reaction (I) with $Ca(OH)_2$ is clearly superior. The only raw materials required therein are iron, water, calcium hydroxide and electricity, whereas reaction (J) additionally requires NaOH and must dispose of NaCl.

If $Ca(OH)_2$ is employed as the calcium compound, it is generally preferred to use a molar ratio of calcium carbonate to sodium ferrate in the anolyte in the range of from about 1:1 to about 100:1 to ensure complete conversion of the sodium ferrate to calcium ferrate. More preferably, this molar ratio is in the range of from about 1:1 to about 10:1. Most preferably, the molar ratio is from about 1:1 to abut 2:1. However, if it is desired to only convert a portion of the sodium ferrate in the anolyte solution, it may be desirable to use molar ratios of $Ca(OH)_2:Na_2FeO_4$ of less than about 1:1. If other calcium compounds are employed (e.g., $CaCl_2$), generally the molar ratios with the above ranges are employed.

For the reaction of $Ca(OH)_2$ with $Na_2FeO_4$ to occur promptly and without product degradation, it is generally preferred to employ reaction temperatures in the range from about 10° C. to about 60° C. Most preferably, temperatures in the range from about 30° C. to about 50° C. are employed. Reaction times for reacting $Ca(OH)_2$ with $Na_2FeO_4$ preferably range from about 10 minutes to about 300 minutes in a stirred reactor. More preferably, reaction times are from about 20 minutes to about 200 minutes. Of course, if other calcium compounds are used instead of $Ca(OH)_2$, then the reaction temperatures and time may vary from these ranges.

The reaction preferably occurs at atmospheric pressure; although sub-atmospheric and super-atmospheric pressures may be utilized. Of course, it should be recognized that any of the above-noted reaction parameters, besides the reactants themselves, are subject to many factors and, thus, are not critical limitations of the present invention.

In another preferred operation, a calcum compound, preferably a hydroxide such as $Ca(OH)_2$, is directly added to the anolyte chamber of the membrane cell. The calcium compound reacts with the sodium ferrate as it is produced in the anolyte. The reaction product will immediately precipitate and may be removed continuously, or periodically by conventional solid/liquid separation means. Since the anolyte and catholyte are both at very high pHs, there should be no or little membrane degradation by calcium ions.

In still another preferred embodiment, sodium ferrate may first be recovered in a solid form [e.g., by removing the anolyte from the anolyte chamber, cooling the anolyte to below room temperature (e.g., from about 5° C. to about 18° C.) and then filtering the solid sodium ferrate from the aqueous sodium hydroxide solution] and then reacting with a calcium compound to produce the calcium/sodium ferrate adduct.

9. Recovery of the Calcium/Sodium Ferrate Adduct

Upon the reaction of a calcium compound and $Na_2FeO_4$, the resulting solid adduct product precipitates from the solution. The precipitated product may be separated from the sodium hydroxide solution by any suitable solid/liquid separation means. The separated solid product is then dried, preferably after a washing operation, to dissolve and remove any water, sodium hydroxide or other impurities still attached to the product. The dried product is a purple powder having a sodium ferrate content ranging from about 2% to about 10% by weight.

An alcohol extraction agent may be employed to wash and remove at least a portion of NaOH and $H_2O$ along with a portion of the remaining halide salts and unreacted calcium hydroxide from the precipitated and separated adduct product. This may be done in any conventional leaching extraction equipment. The alcohol, NaOH and water mixture may be then flash distilled to make an aqueous sodium hydroxide stream and alcohol vapor stream, which are separated. The alcohol stream may be recycled back to the leaching step so that the amount of alcohol continuously added to the process may be minimized.

The preferred alcohols for extraction of sodium hydroxide and water from the calcium/sodium ferrate adduct are low-molecular weight secondary alcohols; specifically, isopropyl or sec-butyl alcohols, or mixtures thereof. Methanol and ethanol and other related primary alcohols are oxidized quickly at room temperature by the calcium/sodium ferrate adduct and sodium ferrate. Alcohols having higher molecular weights than the first-named two alcohols have very low sodium hydroxide solubilities which make them poor extraction agents.

Continuous extraction may be carried out under vacuum to avoid filtration and air exposure. This will improve the storage stability of the calcium/sodium ferrate adduct.

If an alcohol is utilized to leach the separated solids, it is preferred that the weight ratio of alcohol, in the case of isopropyl alcohol, to the total separated solids is from about 1:1 to about 500:1. More preferably, this weight ratio is from about 2:1 to about 120:1. In general, the weight ratio of alcohol, in the case of isopropyl alcohol, to the weight of the adduct in the solids is preferably about 10:1 to about 10,000:1. More preferably, this weight ratio ranges from about 100:1 to about 500:1. If other alcohols are used, generally the same ratios are employed.

It should be realized that these extraction weight ratios are based on single contact extractions with no extractant or raffinate recycle. Much less alcohol overall is used if the alcohol is separated from the caustic and water has extracted and is then recycled back into the process.

In another embodiment, the slurry prepared in the calcium/sodium ferrate adduct reactor is separated into solid and liquid phases in a settling tank. The liquid phase is then separated from the solid product by decanting or by a basket-type centrifugal filter. The separated liquid NaOH solution may be then recycled back to the electrolysis cell. Generally, this recycled NaOH solution contains not more than a small percentage of unreacted sodium ferrate.

The solid calcium/sodium ferrate adduct product which contains some unreacted NaOH, unreacted calcium hydroxide, halide salts and water is then transferred to an extractor, most preferably, a continuous dispersed-solids leaching extractor. The extraction solvent is, most preferably, isopropyl alcohol because of the high solubility of water and NaOH in it. Secondary butanol is next preferable, with slightly lower solubilities and a higher boiling point. The extracted solid calcium/sodium ferrate adduct is withdrawn from the leaching unit and is dried of alcohol by low-temperature heating with vacuum or by filtration with ether to form a dry, stable product. The extractant solvent is sent to a flash column where the alcohol is distilled off and then returned to the leaching extractor. The resulting NaOH solution from this distillation is also returned to the electrolysis cell.

Besides the above-mentioned calcium/sodium ferrate adduct recovery steps, persons skilled in this art will recognize other suitable processes for recovering the ferrate product from the NaOH solution. The present invention intends to encompass all such suitable recovery processes and is not to be limited to any particular sequence of steps or to a step.

10. Other Preferred Embodiments and Utility

In another preferred operation, the cell contains means to recycle the sodium hydroxide solution used in the catholyte chamber to the anolyte chamber where it is employed as part of the anolyte.

As mentioned above, the anolyte after removal from the cell, is treated to separate the calcium/sodium ferrate adduct product from the sodium hydroxide solution and then the sodium hydroxide solution is recycled back to the anolyte chamber.

In a second preferred operation, both recycle streams of these preferred operations are combined together and recycled back to the anolyte chamber. Any conventional means for pumping and the like may be used for these recycle operations.

Another preferred embodiment is to pretreat any ferric salts used as the ferric ion source in the anolyte chamber in order to convert any ferrous ($Fe^{+2}$) impurities therein to ferric ($Fe^{+3}$) ions. Such pretreatments may be carried out by either heating the ferric salt themselves or the anolyte containing these to about 70° C. to about 100° C. for a short period of time (e.g., less than 60 minutes) before electrolysis begins. Other weak oxidation methods (e.g., oxygen or chlorine treatment) may also be used.

Still another preferred embodiment is to ensure that the anolyte is saturated with oxygen ($O_2$ during the electrolysis operation when an iron anode is employed. This may increase the sodium ferrate yield by destruction of any impurities present (e.g., $Fe^{+2}$ impurities in the anode) and increasing the number of ferric ions on the surface of the anode.

The ferrate adduct of the present invention may be introduced into a waste-water or process-water streams for the beneficial results of an oxidant of impurities. The products of the oxidation reaction will be ferric salts and calcium hydroxide which precipitate and are removed by standard methods. The adduct may also be fed directly to heating and cooling water streams or potable water streams in order to oxidize organic contaminants (e.g., phenols and cyanides) or destroy biological contaminants (i.e., bacteria); as well as be employed to precipitate undesirable metal ions and thus improve both taste and color of the streams. The aforementioned time release capabilities of the calcium/sodium ferrate adduct product adds considerable versatility to the techniques for accomplishing such improvements.

These and other embodiments of the present invention are illustrated by the following examples. All parts and percentages are by weight unless explicity stated otherwise.

EXAMPLE 1

A calcium/sodium ferrate adduct was prepared from a solution which was previously prepared batchwise in an electrolytic cell comprising a high purity ingot iron anode, a cathode, an anolyte chamber, a catholyte chamber and a membrane-type separator.

The cell anode was a ½ inch thick rectangular flat piece of #1014 mild steel plate of dimensions 5.1 cm wide by 7.0 cm high, which gave a front face active surface area of 35.7 cm$^2$. A ⅛ inch diameter steel wire was spot-welded to the back of the steel piece, and the steel wire, the back of the piece and the sides of the steel piece were covered with epoxy and allowed to set thoroughly. This ensured that only the front face of the steel anode was active to electrochemical reaction.

The cell cathode was a piece of 0.03 cm thick nickel expanded-mesh with ¼×⅛in. diamond openings with dimensions of 5.1 cm wide by 7.0 cm high, connected to the power supply by a ⅛ inch diameter nickel wire.

A perfluorosulfonic acid resin membrane was positioned between the two electrodes and the two cell halves. The anode to membrane gap was about ¼ inch, and the cathode to membrane gap was about 1/16 inch. The membrane was a homogeneous perfluorosulfonic acid resin membrane, 5 mils thick 1200 equivalent weight, laminated with T-12 fabric of polytetrafluoroethylene. This membrane is sold commercially by the Dupont Company as Nafion ® 425 brand membrane. It had an active area of the membrane during operation of 5.1 cm by 7.0 cm or 35.7 cm$^2$. It was soaked in 15 wt. % NaOH for 18 hours prior to cell operation.

A series of batchwise electrolysis runs were completed in order to obtain a larger amount of sodium ferrate solution. The cell was run at temperatures between 15°–30° C. during these runs at varying current densities, ferrate current efficiencies, voltages and run duration times. The anolyte feed solution used was 45% NaOH, 0.16 wt. % NaCl in all runs. 45% NaOH without NaCl addition was used in the catholyte in all runs.

The sodium ferrate/NaOH solutions were combined into a single larger quantity and a portion of this solution was used in the experiment to be described below. The solution analyzed 0.16 wt. % NaCl, 47 wt. % NaOH and 0.288 wt. % Na$_2$FeO$_4$.

At room temperature (25° C.) 140 mls of this 0.288 wt. % solution was placed in a 500 ml beaker. One gram of technical-grade calcium hydroxide Ca(OH)$_2$ was added to the solution and it was stirred rapidly and allowed to react at room temperature for 1.0 hour.

An apparatus was assembled which comprised of a 10 micron 500 ml glass frit vacuum filter fitted on top of a 4.0 liter Erlenmeyer vacuum flask, connected to a single-stage vacuum pump. At 25° C., the entire sample of reacted mixture was filtered through the glass filter under a vacuum of 25 inches of Hg. A dark, muddy purple solid was formed on the surface of the filter, and the filtrate liquid possessed a definite purple color, but somewhat decreased in intensity compared to the reacted mixture. The filtrate was analyzed and was about 0.18 wt. % Na$_2$FeO$_4$, such that about 37.5% of the sodium ferrate material had reacted and had been separated from the cell liquor as the adduct product. The purple, muddy, somewhat wet cake from the filter was removed and weighed 5.31 g. The solid was placed in a 250 ml beaker and mixed thoroughly at high shear rate with 200 mls of isopropanol for 15 minutes. The stirrer was turned off, the solid product allowed to settle, and the alcohol containing NaOH and NaCl was decanted and discarded. This ispropanol washing procedure was repeated three more times. On the final washing, the isopropanol-ferrate adduct suspension was transferred to a clean, dry vacuum filter. The isopropanol was pulled away, then 400 mls of diethyl ether was pulled through the purple solid. The solid was immediately transferred to a glass watch glass and placed in a vacuum dessicator. 25 Inch Hg vacuum was pulled for 3.0 hours on the material. The purple solid sample weighed 4.23 g and was analyzed to be 7.5% by weight Na$_2$FeO$_4$, with the rest of the mixture being calcium hydroxide, sodium hydroxide and sodium chloride. These results represent a 38.5% recovery efficiency of sodium ferrate from the sodium ferrate cell liquor sample.

This Example has shown that an adduct of sodium ferrate and calcium hydroxide can be produced by a method which begins with an iron species, sodium hydroxide, sodium chloride and water, utilizing electrolysis, a conversion reaction and a separation and recovery to produce a useful calcium hydroxide-sodium ferrate adduct product. Use of lime (Ca(OH)$_2$) offers superior process advantages and produces a product which is particularly useful for waste-water treatment. Isopropanol extraction offers a unique commercial separation method for producing calcium/sodium ferrate adduct products.

EXAMPLE 2

The procedure of Example 1 was repeated with a 50% caustic solution containing 0.163% Na$_2$FeO$_4$. This was admixed with 1.73 grams of Ca(OH)$_2$ to form a dried adduct product analyzing 24.5% Ca, 22.4% Na and 22.46% OH$^-$. This calculates to an adduct composition comprising
2.2% Na$_2$FeO$_4$
38.0% NaOH
47.1% Ca(OH)$_2$
12.7% various iron oxide impurities.
X-ray powder diffraction analysis of the product showed the presence of Fe(OH)$_2$, γ-Fe$_2$O$_3$, Fe$_3$O$_4$, FeO, Na$_2$FeO$_4$, NaOH and CaO.

EXAMPLE 3

Using the same 0.288 wt. % Na$_2$FeO$_4$ batch solution used in Example 1, the same procedure was followed as in Example 1 for producing a calcium/sodium ferrate adduct solid. The procedure and all quantities were exactly the same, to the point where the dark purple ferrate muddy solid had been filtered, producing the somewhat wet cake on the vacuum filter. At this point, the solid was removed with minimum loss from the vacuum filter and was weighed in a 250 ml beaker, resulting in 4.63 g of material. 500 Mls of secondary butanol was added and the suspension was stirred at high shear rate and stirring velocity for 15 minutes. The stirrer was turned off and the solid was allowed to settle. The secondary butyl alcohol containing NaOH and NaCl was decanted away and discarded. This 500 ml sec-butanol washing was repeated three more times. On the final washing, the suspension was not decanted and was transferred to a clean, dry vacuum filter. The alcohol was pulled away by vacuum, leaving the alcohol-wet calcium-sodium ferrate solid. 400 Mls of diethyl ether was poured over the solid and pulled through it by vacuum. The filter with the solid on its frit was immediately transferred to a vacuum dessicator and 25 in. Hg vacuum was pulled on the material for 3.0 hours. The purple solid weighed 2.72 g and was analyzed to be 2.1 wt. % $Na_2FeO_4$ with the rest being a mixture of calcium hydroxide, sodium hydroxide and sodium chloride. These results represent a 9.85% recovery efficency from the sodium ferrate anolyte sample.

This Example repeated the procedure of Example 1 and has shown that secondary butanol can be used as an extraction and washing agent for NaOH and NaCl removal, as an alternative to isopropanol.

EXAMPLE 4

Solid calcium/sodium ferrate adduct product was produced by the same method as used in Example 1, and samples of this product were used in experiments to determine the usefulness of the adduct in the removal or destruction of environmentally-harmful phenols, cyanides and biocidal activity in industrial or municipal waste-waters.

The solid calcium/sodium ferrate adduct sample used had a concentration of 3.2 wt. % $Na_2FeO_4$ on a Ca-(OH)$_2$ matrix. Aqueous solutions of phenol and sodium cyanide were prepared at concentrations of 500 ppm phenol and 3.5 ppm sodium cyanide (NaCN). At room temperature, measured amounts of calcium-sodium ferrate solids were added to each solution, then stirred and reacted for 10 minutes. Each sample was then analyzed by the standardized Americal Public Health Association methods for phenol and cyanide anlaysis of trace quantities in waste-waters. For phenol, this is the 4-aminoantipyridine method. For cyanide, this is the pyridine-pyrazalone method. The following results were obtained:

| Amount of Poison | Ca Adduct Added | Resulting pH | Contact Time | Residual Poison | Destruct Ratio |
|---|---|---|---|---|---|
| 500 ppm Phenol | 400 ppm | 125 | 10 min. | 336 ppm | 2.4:1 |
| 3.5 ppm Cyanide | 44.8 ppm | 9.0 | 10 min. | 1.6 ppm | 24:1 |

The destruct ratio is defined as milligrams of oxidant consumed per milligram of poison destroyed or removed. These results show that cyanide and phenol can be effectivly removed and destroyed by treatment of waste-waters with the calcium adduct products which are prepared by the method used in Example 1.

The same 3.2 wt. % $Na_2FeO_4$ solid was used in the experimental test of the effectiveness of the adduct as a waste-water biocide. In this test, a river water sample was used for microbiological plate counts on standard agar in the presence of the adduct at two concentrations. A control was used for comparison. One milliliter water samples were placed on the plates, and colony counts were taken after 48 hours of incubation. The following results were obtained:

| Treatment | Dosage | Resulting pH | Total Plate Count after 48 hours incubation |
|---|---|---|---|
| None (Control) | — | 7.0 | 10,300 |
| "Adduct" | 100 ppm | 12.0 | 2,200 |
| "Adduct" | 10 ppm | 7.0 | 2,670 |

The results clearly indicate that the calcium/sodium ferrate adduct is very effective in reducing the harmful biological activity which is present in this river water.

What is claimed is:

1. A process for producing a calcium/sodium ferrate adduct, utilizing an electrolytic cell having an anolyte chamber containing an anode, a catholyte chamber containing a cathode, and a separator between said chambers, said process comprising the steps of:
    (a) maintaining an aqueous mixture of a sodium hydroxide solution and a sodium ferrate-stabilizing proportion of at least one sodium halide salt in said anolyte chamber, said anolyte chamber additionally containing ferric ions;
    (b) maintaining an aqueous sodium hydroxide solution in said catholyte chamber;
    (c) passing an electric current and impressing a voltage between said anode and said cathode whereby sodium ferrate is formed from said ferric ions in said sodium hydroxide solution in said anolyte chamber;
    (d) reacting said sodium ferrate while in said sodium hydroxide solution with a calcium compound to precipitate said adduct from said sodium hydroxide solution; and
    (e) recovering said precipitated adduct from said sodium hydroxide solution.

2. The process of claim 1 wherein said separator is a gas- and hydraulic-impermeable permselective cation exchange membrane.

3. The process of claim 1 wherein the source of said ferric ions in said anolyte chamber is an iron-containing anode.

4. The process of claim 1 wherein said anode is made of non-ferrous material and the source of said ferric ions in said anolyte chamber is selected from the group consisting of ferric salts, iron particles, iron scraps and mixtures thereof.

5. The process of claim 1 wherein said anode is made of ferrous material and said anolyte chamber contains an additional source of ferric ions selected from the group consisting of ferric salts, iron particles, iron scraps and mixtures thereof.

6. The process of claim 1 wherein the sodium hydroxide concentration is from about 20% to about 65% by weight of said aqueous mixture in said anolyte chamber 7. The process of claim 1 wherein the sodium hydroxide concentration is from about 20% to about 65% by weight of said aqueous sodium hydroxide solution in said catholtye chamber.

8. The process of claim 1 wherein said sodium halide salt is sodium chloride

9. The process of claim 8 wherein the stabilizing proportion of said sodium chloride is from about 100 parts to about 15,000 parts per million parts by weight of said aqueous mixture in said anolyte chamber.

10. The process of claim 9 wherein the stabilizing proportion of said sodium chloride is from about 500 parts to about 10,000 parts per million parts by weight of said aqueous mixture in said anolyte chamber.

11. The process of claim 10 wherein the operating temperature of said electrolytic cell is in the range from about 20° C. to about 60° C.

12. The process of claim 1 wherein the operating temperature of said electrolytic cell is in the range from about 10° C. to about 80° C.

13. The process of claim 1 wherein the amount of sodium ferrate formed in step (c) is from about 0.001% to about 1.4% by weight of said aqueous mixture in said anolyte chamber.

14. The process of claim 1 wherein said adduct comprises between about 2% and about 10% $Na_2FeO_4$ in a matrix of said calcium compound.

15. The process of claim 1 wherein said calcium compound is calcium hydroxide.

16. The process of claim 15 wherein the molar ratio of said calcium hydroxide to sodium ferrate in said sodium hydroxide solution is in the range from about 1:1 to about 100:1.

17. The process of claim 1 wherein said recovery step (e) comprises:
 (i) separating said precipitated adduct from said sodium hydroxide solution;
 (ii) extracting impurities from said separated precipitated adduct with a secondary alcohol; and
 (iii) drying said extracted adduct.

18. The process of claim 17 wherein said secondary alcohol is isopropyl alcohol.

19. The process of claim 17 wherein said secondary alcohol is secondary butyl alcohol.

20. The process of claim 1 wherein the weight ratio of said sodium hydroxide to said sodium halide salt in said anolyte chamber is from about 25:1 to about 5,000:1.

21. A process for producing a calcium/sodium ferrate adduct from sodium ferrate, utilizing an electrolytic cell having an anolyte chamber containing an anode, a catholyte chamber containing a cathode, and a separator between said chambers, said process comprising the steps of:
 (a) maintaining an aqueous mixture comprising from about 40% to about 65% by weight of NaOH and a sodium ferrate-stabilizing proportion of at least one sodium halide salt in said anolyte chamber, said anolyte chamber additionially containing ferric ion [Fe(III)];
 (b) maintaining an aqueous sodium hydroxide solution comprising from about 40% to about 65% by weight of NaOH in said catholyte chamber;
 (c) passing an electric current and impressing a voltage between said anode and said cathode at a temperature from about 20° C. to about 60° C. whereby sodium ferrate is formed from said ferric ions in said aqueous mixture in said anolyte chamber;
 (d) wherein said separator is a gas- and hydraulic-impermeable permselective cation exchange membrane;
 (e) reacting said sodium ferrate while in said sodium hydroxide solution with a calcium compound to precipitate said adduct from said sodium hydroxide solution; and
 (f) recovering said precipitated adduct from said sodium hydroxide solution.

22. The process of claim 21 wherein the source of said ferric ions in said anolyte chamber is an iron-containing anode.

23. The process of claim 21 wherein said anode is made of non-ferrous material and the source of said ferric ions in said anolyte chamber is selected from the group consisting of ferric salts, iron particles, iron scraps and mixtures thereof.

24. The process of claim 21 wherein said anode is made of ferrous material and said anolyte chamber contains an additional source of ferric ions selected from the group consisting of ferric salts, iron particles, iron scraps and mixtures thereof.

25. The process of claim 21 wherein the sodium hydroxide concentration is from about 50% to about 65% by weight of said aqueous mixture in said anolyte chamber.

26. The process of claim 21 wherein the sodium hydroxide concentration is from about 45% to about 65% by weight of said aqueous sodium hydroxide solution in said catholyte chamber.

27. The process of claim 21 wherein said sodium halide salt is sodium chloride.

28. The process of claim 27 wherein the stabilizing proportion of said sodium chloride is from about 100 parts to about 15,000 parts per million parts by weight of said aqueous mixture in said anolyte.

29. The process of claim 28 wherein the stabilizing proportion of said sodium chloride is from about 500 parts to about 10,000 parts per million parts by weight of said aqueous mixture in said anolyte.

30. The process of claim 21 wherein the operating temperature of said electrolytic cell is in the range from about 35° C. to about 50° C.

31. The process of claim 21 wherein the amount of sodium ferrate formed in step (c) is from about 0.1% to about 1.0 weight of said aqueous mixture solution in said anolyte chamber.

32. The process of claim 21 wherein the gap from said anode to said membrane is up to about 1 inch.

33. The process of claim 21 wherein the gap from said cathode to said membrane is up to about ½ inch.

34. The process of claim 21 wherein said adduct comprises between about 2% and about 10% by weight in a matrix of said calcium compound.

35. The process of claim 21 wherein said calcium compound is calcim hydroxide.

36. The process of claim 35 wherein the molar ratio of calcium hydroxide to sodium ferrate is in the range from about 1:1 to about 10:1.

37. The process of claim 36 wherein said molar ratio of said calcium hydroxide to said sodium ferrate in said sodium hydroxide solution is in the range from about 2:1 to about 120:1.

38. The process of claim 21 wherein said recovery step (f) comprises:
 (i) separating said precipitated adduct from said sodium hydroxide solution;
 (ii) extracting said separated precipitated adduct with a secondary alcohol; and
 (iii) drying said extracted adduct.

39. The process of claim 38 wherein said secondary alcohol is isopropyl alcohol.

40. The process of claim 38 wherein said secondary alcohol is secondary butyl alcohol.

41. The process of claim 1 wherein the weight ratio of said sodium hydroxide to said sodium halide salt in said anolyte chamber is from about 25:1 to about 1,000:1.

* * * * *